(12) United States Patent
Garvin

(10) Patent No.: US 8,920,088 B1
(45) Date of Patent: Dec. 30, 2014

(54) TARRED ROOFING NAIL

(71) Applicant: Christopher P. Garvin, South Lyme, CT (US)

(72) Inventor: Christopher P. Garvin, South Lyme, CT (US)

( * ) Notice: Subject to any disclaimer, the term of this patent is extended or adjusted under 35 U.S.C. 154(b) by 0 days.

(21) Appl. No.: 13/651,553

(22) Filed: Oct. 15, 2012

(51) Int. Cl.
*F16B 1/00* (2006.01)
*F16B 15/00* (2006.01)

(52) U.S. Cl.
CPC .................................. *F16B 15/0092* (2013.01)
USPC ........................... 411/82.3; 411/442; 411/443

(58) Field of Classification Search
USPC .......... 411/82, 82.2, 82.3, 442–443, 512, 542, 411/901, 914, 920; 52/741.4
See application file for complete search history.

(56) References Cited

U.S. PATENT DOCUMENTS

| | | | | |
|---|---|---|---|---|
| 2,724,303 A * | 11/1955 | Holcomb | ....................... | 411/439 |
| 2,761,347 A * | 9/1956 | McKee, Jr. | ................ | 411/371.1 |
| 3,202,033 A * | 8/1965 | Weidner, Jr. | ................ | 411/371.1 |
| 3,286,577 A * | 11/1966 | Weidner, Jr. | ................... | 411/542 |
| 3,299,766 A * | 1/1967 | Gould et al. | ................ | 411/371.1 |
| 3,300,173 A * | 1/1967 | Kennedy, Jr. | ................. | 248/467 |
| 3,316,952 A * | 5/1967 | Hollinger | ....................... | 411/301 |
| 3,485,132 A * | 12/1969 | Hanny et al. | ................... | 411/548 |
| 3,495,368 A * | 2/1970 | Krause | ............................. | 52/469 |
| 4,292,876 A * | 10/1981 | De Graan | ....................... | 411/542 |
| 4,310,273 A * | 1/1982 | Kirrish | ........................... | 411/338 |
| 4,763,456 A | 8/1988 | Giannuzzi | | |
| 4,863,330 A * | 9/1989 | Olez et al. | ...................... | 411/424 |
| 4,887,951 A * | 12/1989 | Hashimoto | ................ | 411/371.1 |
| 5,281,065 A * | 1/1994 | Wu | ................................ | 411/258 |
| 5,800,891 A | 9/1998 | Wasitis | | |
| 5,909,993 A * | 6/1999 | Leistner | ........................ | 411/442 |
| 6,035,595 A * | 3/2000 | Anderson | ........................ | 52/363 |
| 7,618,222 B2 * | 11/2009 | Kim | ................................ | 411/442 |
| 7,771,807 B2 | 8/2010 | Hubbard | | |
| 7,950,885 B2 * | 5/2011 | Rosenkranz | ................. | 411/82.2 |
| 2006/0099370 A1 | 5/2006 | Glass | | |
| 2007/0199276 A1 | 8/2007 | Duque | | |

* cited by examiner

*Primary Examiner* — Roberta Delisle
(74) *Attorney, Agent, or Firm* — Robert C. Montgomery; Montgomery Patent & Design

(57) ABSTRACT

A self-sealing roofing nail for reducing or preventing roof leaks. The self-sealing roofing fastener includes a pointed fastener shaft and a fastener head. A small sleeve having a rupturing shell containing a volume of sealant is disposed over the fastener shaft and adjacent the fastener head. When the self-sealing roofing fastener is driven into a structure using a hammer or a nail gun, the shell ruptures and releases the sealant between the fastener head and a structure. The released sealant seals the puncture caused by driving the roofing fastener into the structure.

10 Claims, 5 Drawing Sheets

TARRED ROOFING NAIL

RELATED APPLICATIONS

There are no current co-pending applications.

FIELD OF THE INVENTION

The present invention is directed to roofing materials and supplies. More particularly, this invention relates to self-sealing roofing fasteners having a pointed fastener shaft, a fastener head, and a sleeve with a rupturing shell that contains a volume of sealant and which is disposed over the shaft and adjacent the head.

BACKGROUND OF THE INVENTION

One (1) of America's major economic activities is construction. Buildings need to be planned, financed, erected, torn down, moved, wired, re-wired, refurbished, remodeled, and enlarged. Anyone involved in the physical aspects of construction can testify to just how strenuous construction is, whether it is carpentry, bricklaying, foundation work or just about any other task associated with construction.

One (1) particularly difficult and dangerous construction task is roofing. A roofer typically carries heavy loads, endures high temperatures, and climbs steep ladders and roofs at dangerous elevations. A roofer usually lays a protective coated paper underlay over wood flooring and then lays shingles or other roofing material over the coated paper. The various layers are typically nailed down using roofing fasteners such as nails. One (1) task that must often be performed is sealing the roofing fasteners with tar after they have installed the various roofing materials. Sealing is not only messy, but takes time, which results in lost profits. Should the roofing fasteners not be properly sealed roof leaks may result, causing warranty work and unhappy customers.

Accordingly, there exists a need for self-sealing roofing fasteners that can be quickly and easily installed. Such self-sealing roofing fasteners would automatically seal nail holes when the fastener is installed. This would eliminate having to stop and seal the nail holes or to go back and seal them afterwards. That would save time and money, resulting in a higher quality job with minimal work. Beneficially self-sealing fasteners would be suitable for use with both existing nail guns and hammers, would be available in a range of different lengths and styles, and would reduce the mess of sealing nail holes.

SUMMARY OF THE INVENTION

The principles of the present invention provide for self-sealing roofing fasteners that automatically seal nail holes when the self-sealing roofing fasteners are installed. Such roofing fasteners can be implemented for use with existing nail guns and hammers and can be made available in a range of different lengths and styles.

A self-sealing fastener that is in accord with the present invention includes a fastener head, a fastener shaft that extends from the fastener head, and a sealing sleeve around the fastener shaft and adjacent the fastener head. The sealing sleeve includes an outer shell that retains a sealant. The self-sealing fastener may be a hollow, cylindrical plastic form having an inner diameter that is dimensioned to fit snugly and permanently over the fastener shaft to restrict the flow of the sealant on the shaft. The sealant is beneficially an air-curable liquid sealing material such as tar or an adhesive.

A self-sealing fastener system that is in accord with the present invention includes a plurality of fasteners, each having a fastener shaft that extends from a fastener head and a sealing sleeve that is located around the fastener shaft and adjacent to said fastener head. Each sealing sleeve includes an outer shell that retains a sealant. A pair of parallel coil wires connects the plurality of fasteners into a coil of fasteners. Each sealing sleeve is a hollow, cylindrical plastic form having an inner diameter that is dimensioned to fit snugly and permanently over a fastener shaft to restrict the flow of the sealant on the shaft. The sealant is beneficially an air-curable liquid sealing material such as tar or an adhesive.

An alternative self-sealing fastener that is in accord with the present invention includes a fastener head, a fastener shaft that extends from the fastener head, a sealant over the fastener shaft and adjacent the fastener head, and a coating over the sealant. The coating is preferably a sprayed on plastic material. The sealant is beneficially an air-curable liquid sealing material such as tar or an adhesive.

An alternative self-sealing fastener system that is in accord with the present invention includes a plurality of fasteners, each having a fastener head, a fastener shaft that extends from the fastener head, a sealant over the fastener shaft and adjacent the fastener head; and a coating over the sealant. A pair of parallel coil wires connects the plurality of fasteners into a coil of fasteners. In practice the coating is a sprayed on plastic material. The sealant is beneficially an air-curable liquid sealing material such as tar or an adhesive.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
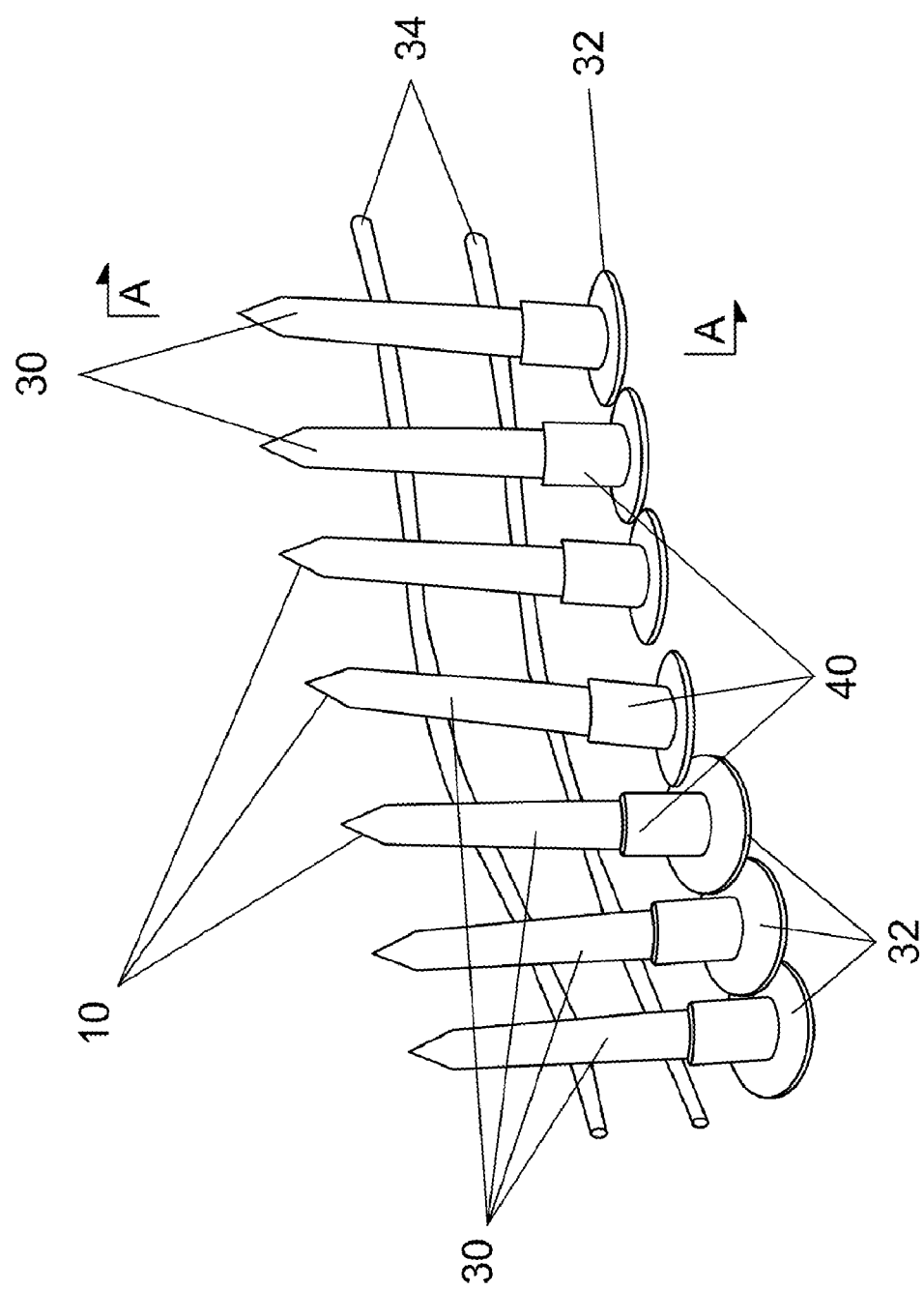
FIG. 1 is a perspective view of a coiled configuration of self-sealing fasteners 10 that are in accord with the principles of the present invention.

DESCRIPTIVE KEY 10 fastener
30 fastener shaft
32 fastener head
34 coil wire
40 sealing sleeve
42 outer shell
44 sealant
100 structure
120 spray-coated fastener
122 spray-coating

DETAILED DESCRIPTION OF THE PREFERRED EMBODIMENT

The best mode for carrying out the invention is presented in terms of its preferred embodiment, which is depicted in FIGS.

Figure 3:
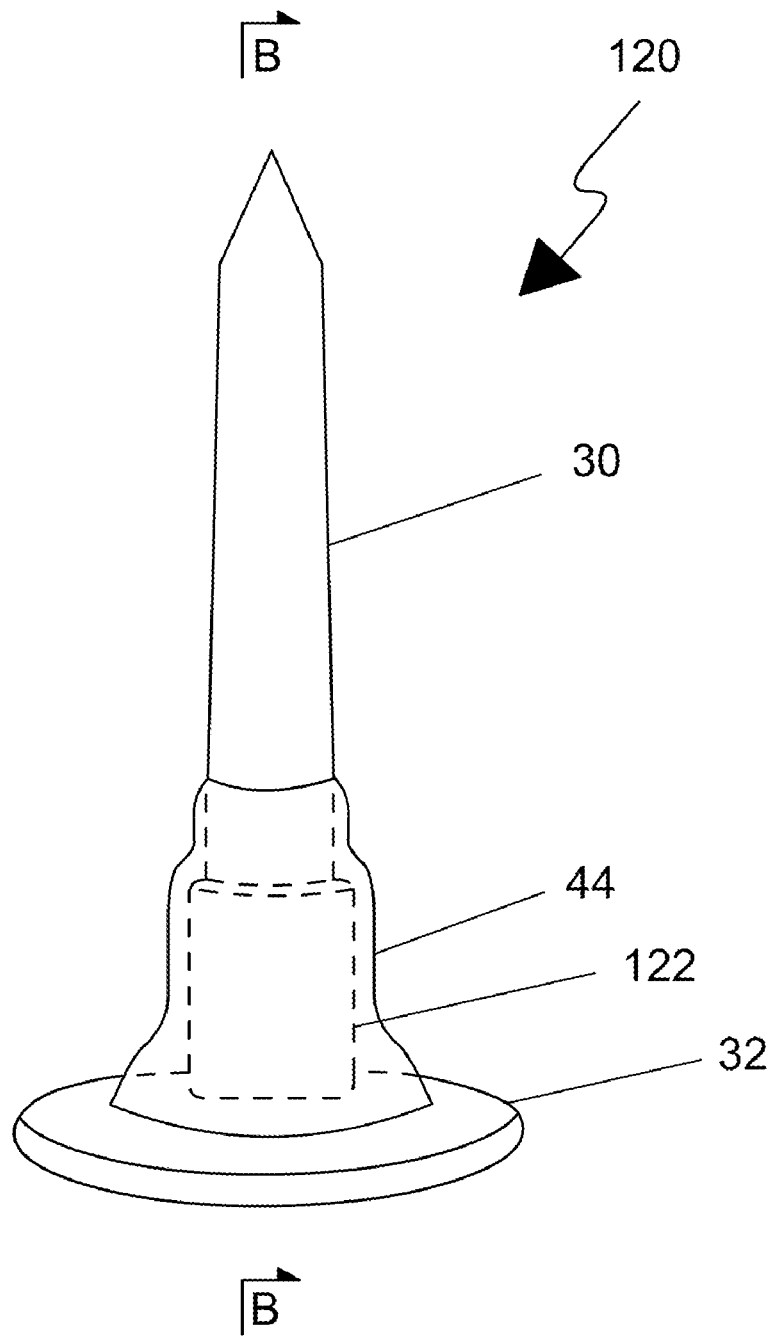
FIG. 3 is a perspective view of a spray coated fastener 120 embodiment that is in accord with the principles of the present invention; and, FIG. 4 is a sectional view of the spray coated fastener 120 shown in FIG. 3.
Figure 4:
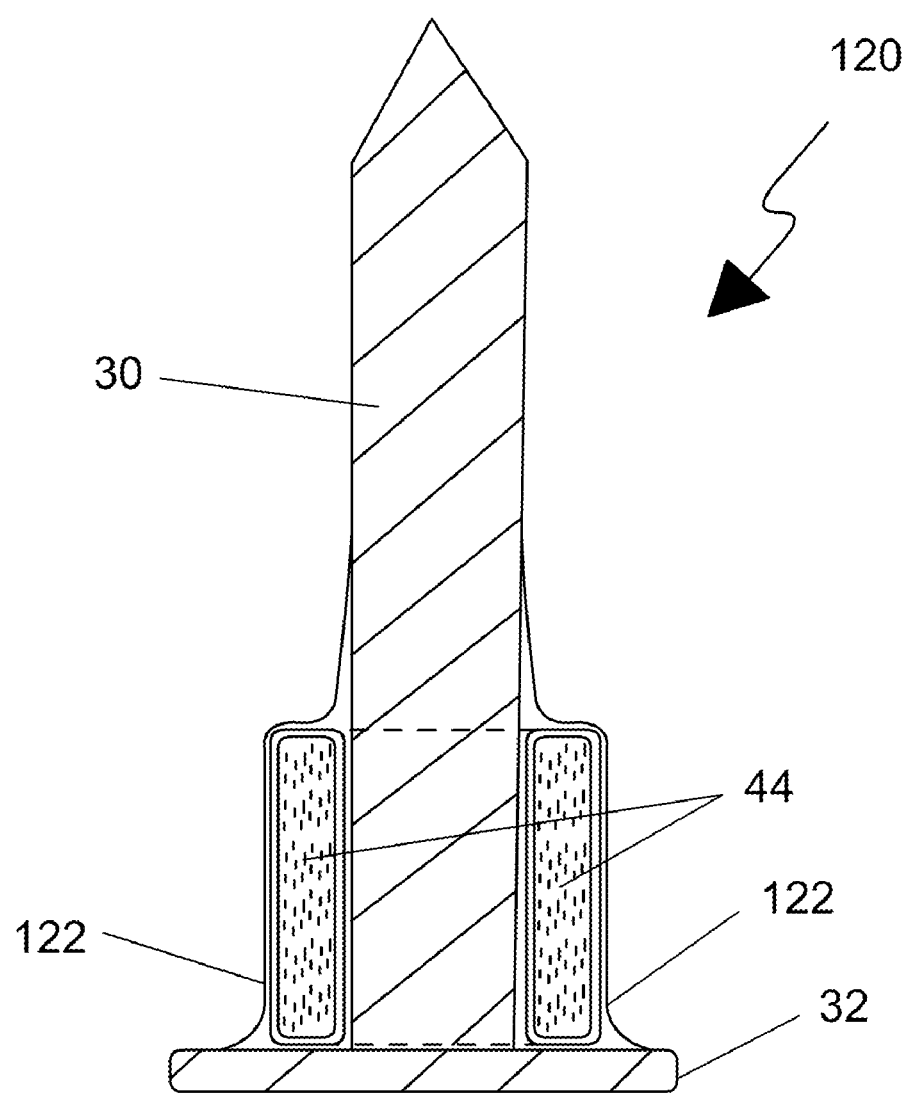

1, 2a, and 2b and in terms of an alternate embodiment, which is depicted in FIGS. 3 and 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Referring now to FIG. 1, the principles of the present invention provide for self-sealing fasteners 10 that automatically seal respective penetration areas during installation of the fasteners 10. The fasteners 10 are envisioned as taking the form of a roofing nail or similar fastener that is susceptible to producing a leak within a structure 100 (see FIG. 2b) after installation.

Figure 2A:
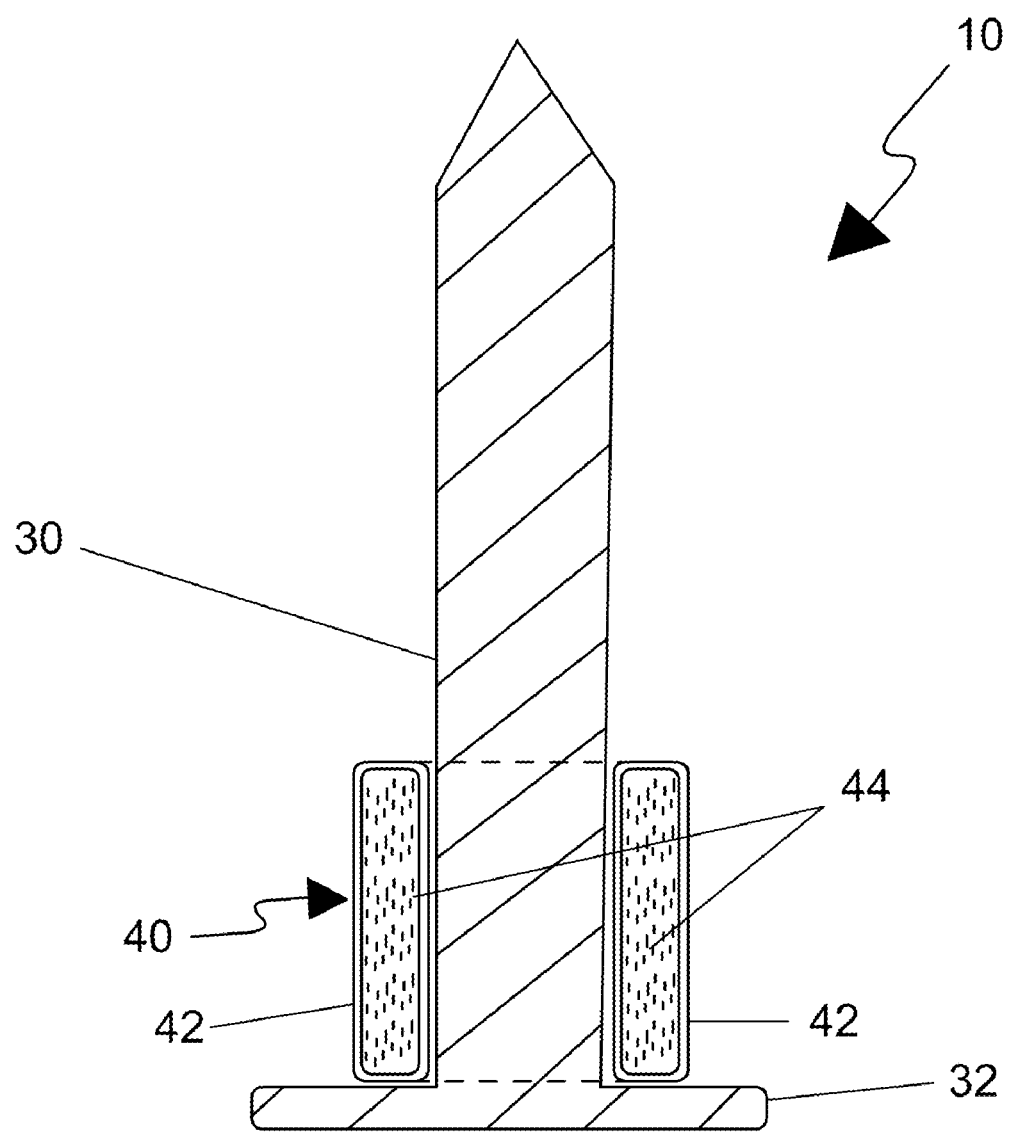
FIG. 2a is a section view of a self-sealing fastener 10 taken along section line A-A of FIG. 1.

As shown in FIG. 1, a plurality of fasteners 10 can be configured in the form of coiled roofing nails such as those used with standard pneumatic nail guns. As shown, each fastener 10 is welded to a pair of parallel coil wires 34. Each fastener 10 comprises a sealing sleeve 40 that is inserted onto a fastener shaft 30 of the fastener 10 and positioned immediately adjacent a fastener head 32. The sealing sleeve 40 aids in sealing holes made by the fastener 10 during installation. Referring now to FIG. 2a, each fastener 10 is also envisioned as being made available as individual nails rather than as part of a spool. This enables a user to install the fasteners 10 with a hammer or similar tool.

Figure 2B:
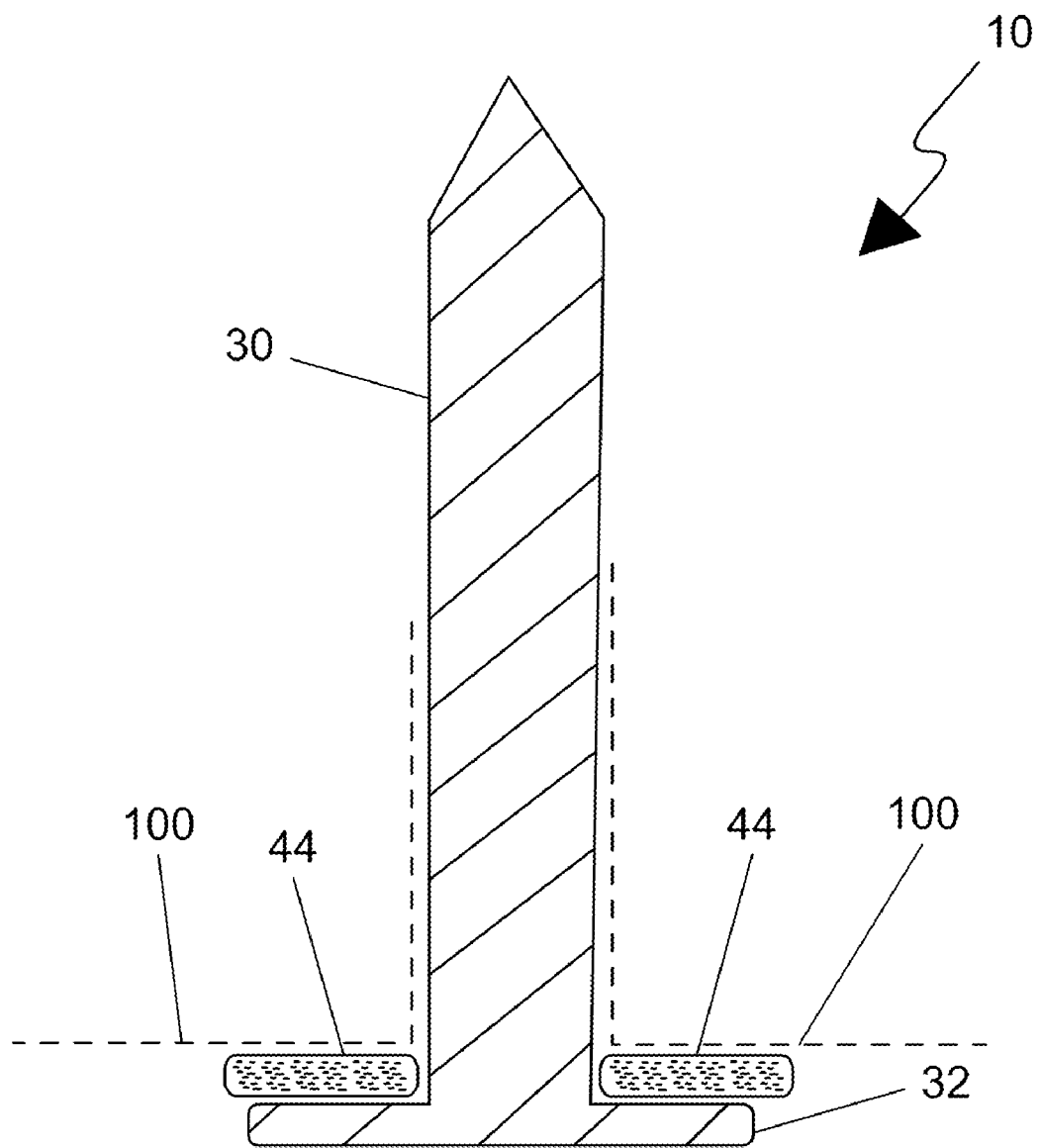
FIG. 2b is section view of the self-sealing fastener 10 of FIG. 2a after installation.

Referring now to FIGS. 2a and 2b, the fastener 10 generally takes the form of a common roofing nail. The fastener 10 has a pointed cylindrical fastener shaft 30 and a perpendicularly extending fastener head 32. While FIGS. 2a and 2b show rather plain nails, it should be understood that fasteners 10 may incorporate features such as ribbed or threaded fastener shafts, specialized fastener heads, and the like.

Still referring to FIGS. 2a and 2b, the fastener 10 also includes a sealing sleeve 40 having a hollow cylindrical shape with an inner diameter dimensioned to fit snugly and permanently over the fastener shaft 30 to restrict the flow of the sealant on the shaft. The sealing sleeve 40 has an outer shell 42 which provides containment and encapsulation of a core comprised of a sealant 44. That sealant is envisioned as being an air-curable liquid sealing materials such as tar, various industrial adhesives, and the like. The outer shell 42 forms a thin and easily ruptured sealed barrier. It is envisioned that the outer shell 42 is made from polyvinylidene chloride, polyethylene, or the like. The sealing sleeve 40 is positioned immediately adjacent the fastener head 32 on the fastener shaft 30.

Referring to FIG. 2b, as the fastener 10 is driven through a structure 100 by the pneumatic nail gun or by a hammer, the outer shell 42 of the sealing sleeve 40 ruptures and deforms to release the contained sealant 44. The sealant 44 seals the fastener head 32 and the structure 100 so as to provide a waterproof protective seal that prevents leakage over time.

Beneficially a plurality of the fasteners 10 may be configured for use with existing unmodified nail guns to perform new roofing jobs, replacement roofing jobs, as well as a variety of projects designed to cover a structure 100.

Referring now to FIGS. 3 and 4, perspective and section views of an alternate spray-coated embodiment 120 according to an alternate embodiment of the present invention, are disclosed. In lieu of the outer shell 42 to contain the sealant 44, the spray-coated embodiment 120 provides a spray-coating 122 that contains and positions the sealant 44. The spray-coating 122 comprises a sprayed-on or similarly applied material such as latex, vinyl, various sprayed adhesives, or the like. The spray-coating 122 is thin enough to enable rupturing to release the sealant 44.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the fastener 10, it would be installed as indicated in FIG. 1 or alternately in FIG. 4.

The method of utilizing the preferred embodiment of the fastener 10 may be achieved by performing the following steps: procuring the fastener 10 in a desired fastener style and individual or coiled format based upon a particular building project and fastener driving method; utilizing the fastener 10 to secure materials such as shingles, metal roofing, cedar shakes, rolled roofing, siding, and other building materials, in a conventional manner to a structure 100 comprising sheathing, wall coverings, and the like; providing a sealing of the materials and structure 100 via the coincidental collapsing of the sealing sleeve 40 and the penetration of the fastener 10 into the structure 100; and, benefiting from avoidance of possible damage due to leakage commonly associated with penetrating installation of fasteners. The method of utilizing the alternate spray coated embodiment 120 may be accomplished in like manner as the preferred embodiment 10 described above.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A self-sealing fastener, comprising:
   a fastener head;
   a fastener shaft extending from said fastener head; and,
   a sealing sleeve around said fastener shaft and adjacent said fastener head, said sealing sleeve having an outer shell that retains a sealant, wherein said sealing sleeve is a hollow, cylindrical plastic form having an inner diameter dimensioned to fit snugly and permanently over said fastener shaft to restrict the flow of the sealant on the shaft;
   wherein said outer shell forms a thin and easily ruptured barrier; and
   wherein when said outer shell ruptures said sealant is deposited on said fastener head.

2. The self-sealing fastener according to claim 1 wherein said sealant is an air-curable liquid sealing material.

3. The self-sealing fastener according to claim 2 wherein said sealant is a tar.

4. The self-sealing fastener according to claim 2 wherein said sealant is an adhesive.

5. The self-sealing fastener according to claim 1 wherein said sleeve is a sprayed on plastic material.

6. A self-sealing fastener system comprising:
- a plurality of fasteners, each having a fastener shaft extending from a fastener head and a sealing sleeve around said fastener shaft and adjacent to said fastener head, said sealing sleeve having an outer shell that retains a sealant, wherein each sealing sleeve is a hollow, cylindrical plastic form having an inner diameter dimensioned to fit snugly and permanently over a fastener shaft to restrict the flow of the sealant on the shaft, wherein said outer shell is easily ruptured such that when ruptured said sealant is deposited on said fastener head; and,
- a pair of parallel coil wires connecting said plurality of fasteners into a coil of fasteners.

7. The self-sealing fastener system according to claim 6 wherein said sealant is an air-curable liquid sealing material.

8. The self-sealing fastener system according to claim 7 wherein said sealant is a tar.

9. The self-sealing fastener system according to claim 7 wherein said sealant is an adhesive.

10. The self-sealing fastener according to claim 6 wherein said sleeve is a sprayed on plastic material.

\* \* \* \* \*